Jan. 14, 1969 J. R. CHIPMAN 3,422,303
CONVERGENCE CIRCUIT FOR TELEVISION RECEIVERS
Filed Nov. 12, 1965
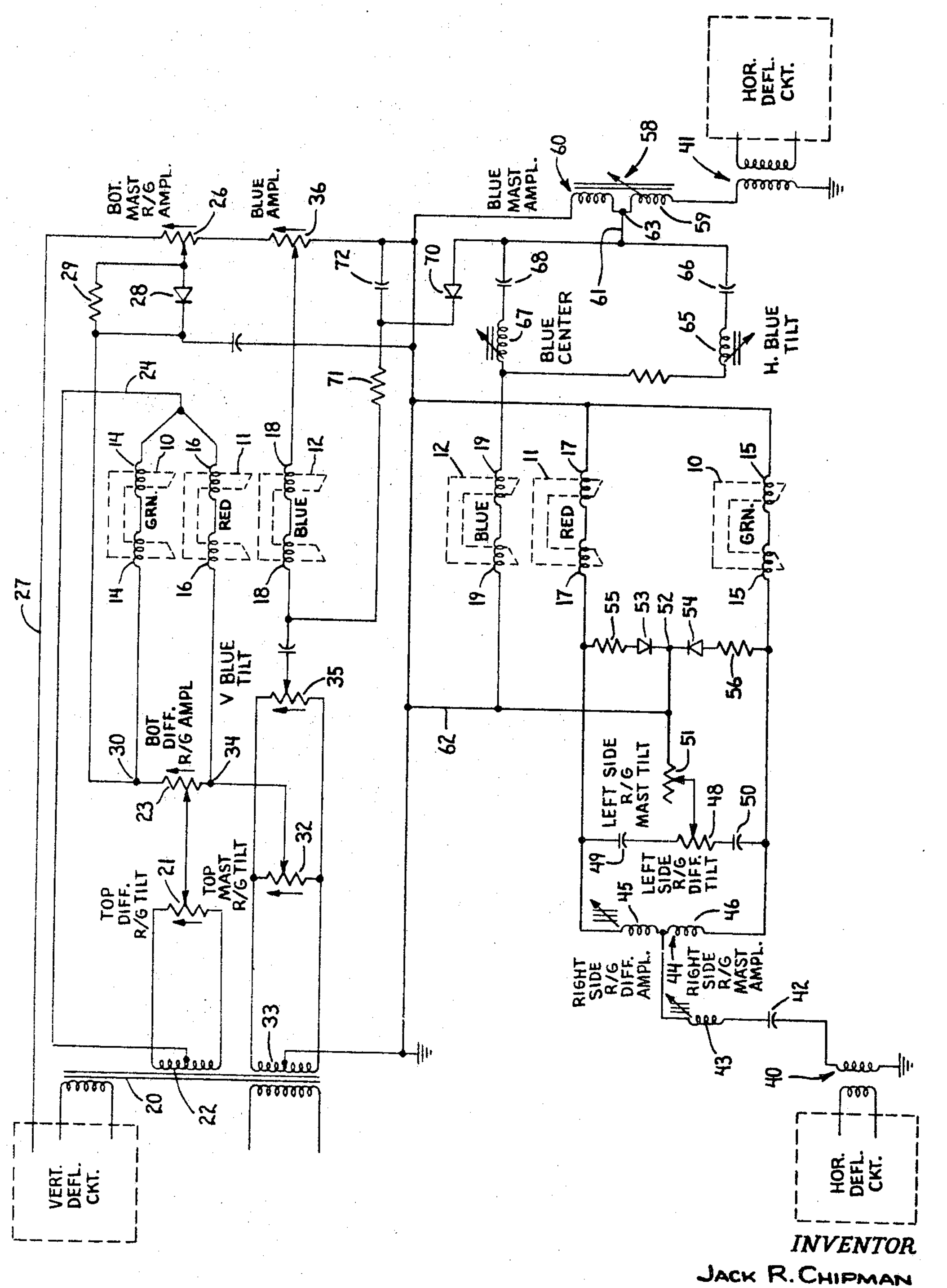
INVENTOR
JACK R. CHIPMAN
BY Lockwood, Woodard, Smith & Weikart
Attorneys 3,422,303

CONVERGENCE CIRCUIT FOR TELEVISION RECEIVERS

Jack R. Chipman, Fort Wayne, Ind., assignor to The Magnavox Company, Fort Wayne, Ind., a corporation of Indiana

Filed Nov. 12, 1965, Ser. No. 507,303
U.S. Cl. 315—13 15 Claims
Int. Cl. H01j *29/50; 31/00*

ABSTRACT OF THE DISCLOSURE

A diode and capacitor, serving as a peak rectifier for horizontal flyback pulses, apply to blue beam vertical convergence coils a direct current proportional to dynamic convergence currents in blue beam horizontal convergence coils, establishing a magnetic flux of opposite polarity to the alternating current flux, providing a clamping effect.

*Background of the invention*

This invention relates generally to color television receivers and more particularly to circuitry for controlling convergence of the cathode ray beams in a 3-gun picture receiving tube.

In conventional 3-gun shadow mask color picture reproducing tubes it is conventional to provide a plurality of three electron guns arranged to form an equilateral triangle with respect to the longitudinal axis of the tube. Each of the guns is tilted slightly toward the center of the picture reproducing screen so that the electron beams converge approximately at this point. In order to achieve precise convergence a small permanent magnet is located adjacent each gun, and these magnets may be adjusted to provide the proper magnetic field intensity in the path of the beams to cause the beams to converge at the center of the screen.

When the electron beams are deflected to scan the screen, misconvergence can occur due to the fact that the guns are tilted and also due to the fact that the screen is substantially flat. In order to correct this type of misconvergence an electromagnet is positioned externally of the tube envelope and adjacent each of the guns. The electromagnet consists of a U-shaped core having a first pair of series connected coils mounted on the arms thereof for correcting misconvergence in the vertical plane of the screen and a second pair of series connected coils mounted on the arms for correcting misconvergence in the horizontal plane.

According to conventional practice the horizontal convergence coils are energized by integrating circuits which, in combination with the coils, produce a current of parabolic wave form. By adjusting these circuits the voltages applied to the coils may be varied to control the amplitude of the parabolic current and to tilt or vary the wave form of the current to cause the beams to converge at a single point in the plane of the shadow mask throughout the entire horizontal scanning paths of the beams. In order to simplify the adjustment of the convergence circuits and to maintain proper convergence despite variations in powerline voltage, so-called direct current clamping means is incorporated in the convergence circuits for the purpose of maintaining beam convergence in the center of the screen as the convergence circuits are adjusted to provide convergence at the edges of the screen. Similar convergence circuits and direct current clamping means is utilized for controlling convergence of the beams throughout the vertical scanning paths of the beams.

The method described above is wasteful of power and can be improved by utilizing resonant networks for controlling amplitude and wave shape of the parabolic coil currents. Resonant networks are highly desirable because their high-Q reactive components provide a cosine current wave form with its inherent superior power efficiency. Resonant networks make it possible to obtain the extremely high blue horizontal convergence currents required for present types of color picture reproducing tubes having the large beam deflection angles. Also, the desired parabolic wave form can be more closely approximated by including second harmonic current in the convergence coils. In the present state of the art, the use of resonant networks is impractical because of the difficulty in providing direct current clamping action in the center of the screen. Without such direct current clamping action, adjustment of the convergence circuits would be extremely difficult, both with respect to manufacturing of receivers and subsequent repair of the receivers. Also, serious misconvergence of the beams would occur with changes in line voltage.

Accordingly, the principal object of this invention is to provide in color television receivers convergence control circuits embodying resonant networks and including a novel means for providing direct current clamping at the center of the beam scanning path on the screen of the picture receiving tube.

Another object of this invention is to provide in color television receivers convergence control circuits which require less power consumption, with consequent improvement in power efficiency.

Still another object of this invention is to provide in color television receivers convergence control circuitry particularly adapted to supply the high currents necessary to control the blue cathode ray beam in receiving tubes having relatively large beam deflection angles.

In accordance with this invention a horizontal convergence circuit is provided incorporating a resonant network for applying parabolic convergence currents to the convergence coils which control horizontal convergence of, for example, the blue cathode ray beam. For obtaining effective direct current clamping at the center of the horizontal scanning path of the beam there is provided a peak rectifier operative to derive a direct current voltage proportional to the adjustable amplitude of the fly-back pulse from which the convergence currents are derived. This direct current voltage is applied to, for example, the blue vertical convergence coils to generate therein a direct current and a resulting magnetic flux proportional to the flux generated by the horizontal convergence coils and opposed thereto. In this manner effective clamping of the blue convergence beam is obtained at the center of the screen.

The full nature of the invention will be understood from the accompanying drawings and the following description and the claims:

The drawing is a schematic diagram of the convergence control circuitry as provided in accordance with this invention.

The drawing illustrates this invention as it may be applied for controlling convergence of the blue cathode ray beam in conjunction with conventional convergence control circuits for the red and green cathode ray beams. For providing vertical convergence, the U-shaped magnetic cores 10, 11 and 12 are located adjacent to the green, red and blue guns, respectively, of a conventional 3-gun shadow mask color television picture receiving tube. A pair of series connected vertical convergence coils 14 and a pair of series connected horizontal convergence coils 15 are mounted on the legs of magnetic core 10 for controlling the green beam. Similarly, coils 16 and 17 are provided on the magnet 11 for controlling the red beam, and coils 18 and 19 are provided on the magnet 12 for controlling the blue beam.

For obtaining a sawtooth voltage for controlling vertical convergence, the transformer 20 may be energized from the output of the vertical deflection circuit. A top differential red-green tilt control potentiometer 21 may be connected across the secondary winding 22 of transformer 20, and the sliding contact of the potentiometer may be connected to the sliding contact of a bottom differential red-green amplitude control potentiometer 23. The green and red windings 14 and 16 are connected across the potentiometer 23 and to a common conductor 24 leading to the center of the secondary winding 22 of transformer 20. A red-green amplitude control potentiometer 26 may be connected to conductor 27 also leading to an output of the vertical deflection circuit, and the sliding contact thereof may be connected to the diode 28 and its parallel resistor 29, these two elements being connected to the junction 30 between potentiometer 23 and the green windings 14.

A top master red-green tilt control potentiometer 32 is connected across another secondary winding 33 of transformer 20, the sliding contact of this potentiometer being connected to the junction 34 between potentiometer 23 and the red convergence coil 16. A vertical blue tilt control potentiometer 35 is connected across potentiometer 32, and its sliding contact is connected to the blue convergence coils 18. Blue amplitude control is provided by potentiometer 36, one terminal of which is connected to potentiometer 26 and the sliding contact of which is connected to the blue convergence coils 18.

The convergence control circuits described above are conventional. The vertical sweep sawtooth current which is derived from the vertical deflection circuit through conductor 27 will produce a sawtooth voltage across potentiometer 26. Since the convergence coils are not pure inductance but are also resistive, the sawtooth voltage is modified by the diode 28 and resistance 29 to produce the required parabolic wave form current in the convergence coils. The diode and its parallel resistor partially clip the negative peak of the sawtooth voltage, thereby to produce the parabolic current. The potentiometer 26 controls the amplitude of this parabolic current and may be adjusted to obtain convergence.

The potentiometer 32 is connected across the special transformer winding 33 which supplies opposite polarities of trapezoidal voltages which, in turn, produce a sawtooth coil current. Depending upon the adjustment of the sliding contact of potentiometer 32, either positive or negative voltages of varying amplitudes may be selected, thereby to divide the current between the red and green convergence coils. Thus, current can be increased in the red coils and decreased in the green coils or vice versa.

Differential red-green tilt control potentiometer 21 may be adjusted to add positive or negative sawtooth current to the parabolic current in the red-green convergence coils. This control affects the beginning portion of the beam trace. Potentiometer 23 operates similarly to affect the lower portion of the vertical scanning trace.

Potentiometer 35 controls vertical convergence of the blue beam by affecting the tilt of the parabolic wave form current in the blue coils, while potentiometer 36 controls the amplitude of the parabolic current. Thus, convergence of the blue beam is controlled throughout the vertical scanning trace.

For controlling convergence of the red, blue and green beams during horizontal deflection, rectangular wave pulses of short duration (12 microseconds, for example) are derived from the horizontal flyback pulses in the horizontal deflection circuit by means of the horizontal output transformer portions 40 and 41. A capacitor 42 and variable inductance are connected in series with one another and to the midpoint of a differential amplitude control inductance 44. Inductance 44 comprises two coils 45 and 46 and an adjustable slug is provided for controlling the amount of current flowing through these two coils. Coil 45 is connected to the red convergence coil 17, while coil 46 is connected to the green convergence coils 15. For controlling left side differential tilt there is provided a potentiometer 48 connected across coils 45 and 46 through capacitors 49 and 50. For providing left side red and green tilt there is provided an adjustable resistor 51, the sliding contact of which is connected to the sliding contact of potentiometer 48. Resistor 51 is connected to the blue convergence coils and also to the junction 52 between diodes 53 and 54, diode 53 being connected to the red convergence coils through resistor 55 and diode 54 being connected to the green convergence coils through resistor 56.

As in the case of vertical convergence control, it is necessary to provide in the horizontal convergence coils currents of parabolic wave form. The square wave horizontal pulses appearing in transformer winding 40, for example, are converted by the impedance of capacitor 42 and inductances 43, 45 and 46 into sawtooth voltages which, in turn, produce currents of parabolic wave form in the convergence coils. Adjustment of inductances 43, 45 and 46 provides amplitude control of the currents in the red and green convergence coils. Potentiometer 48 serves to provide differential tilt control of the trace on the left side of the screen, while resistor 51 provides left side tilt control in the red and green convergence coils. In order to provide direct current clamping to maintain center convergence of the red and green beams, diodes 53 and 54 are provided for impressing the required positive or negative direct current voltage which shifts the axis of the sawtooth voltage wave, thereby to clamp the peak of the parabolic current at the center of the screen. Such direct current clamping is conventional and further explanation is not deemed necessary.

In accordance with this invention a novel means of effectively producing direct current clamping is illustrated as applied to the blue convergence coils. A horizontal rectangular wave pulse of short duration is derived from the horizontal deflection circuit by means of the horizontal output transformer. The inductance 58, consisting of a pair of coils 59 and 60, is connected in series with the pulse output of an auxiliary winding 41 on the horizontal output transformer and to the blue horizontal convergence coils 19 through conductor 61 and conductor 62. Inductance 58 includes a movable slug core which may be adjusted to provide amplitude control of the convergence currents flowing in the blue coils 19. The core can be moved from one coil to the other or be partially in both coils. The impedance of coils 59 and 60 is varied in opposite directions with movement of the slug, thereby to vary the amplitude of the horizontal pulse at the junction point 63 of coils 59 and 60. The resonant network consisting of variable inductance 65, capacitor 66, variable inductance 67, and capacitor 68, is connected between the junction 63 and the blue horizontal convergence coils 19. Typically coils 19 are 150 turns each and have an inductance of 8.5 millihenrys total. Peak-to-peak convergence currents (at horizontal frequency rate) in these coils are in the order of hundreds of milliamperes.

The circuit, consisting of inductance 65, capacitor 66 and coils 19, is tuned to the horizontal scanning frequency of 15.75 kilocycles, while the circuit, consisting of inductance 67, capacitor 68 and the coils 19, is tuned to twice the horizontal scanning frequency or 31.5 kilocycles. This network makes it possible to obtain the extremely high blue horizontal convergence currents of parabolic wave form which are required for color picture reproducing tubes having large deflection angles.

For providing clamping of blue convergence current in coils 19 a diode 70 is connected from the junction 63 through a resistor 71 to the vertical blue convergence coils 18. A capacitor 72 is connected from diode 70 to the ground end of potentiometer 36.

The diode and capacitor 72 function as a peak rectifier of the horizontal fly-back pulse appearing at junction 63 whereby the direct current voltage appearing across capacitor 72 is proportional to the amplitude of the horizontal fly-back pulse at junction 63 and, consequently, is also proportional to the blue horizontal dynamic convergence currents in horizontal blue convergence coils 19. In view of the fact that the blue vertical convergence coils are on the same core 12 as the blue horizontal convergence coils and are thereby magnetically coupled thereto, and since the blue vertical convergence coils 18 are connected to capacitor 72 through resistor 71, a direct current in the blue vertical coils and the resulting magnetic flux therein is proportional to and of opposite polarity to the alternating current flux existing in the horizontal blue convergence coils 19. Therefore, the effect is the same as though the blue convergence current was clamped to a fixed value at the center of the screen.

In the foregoing example, the current derived from the aforementioned peak rectifier 70–72 is applied to the blue vertical convergence coils 18 because typically these coils have approximately 1500 turns each, or ten times the number of turns of the horizontal convergence coils. Deflection of the blue beam is proportional to "ampere turns." Using the greater number of turns on the vertical convergence coils instead of the horizontal coils gives the same movement of the blue beam as would be obtained if a current ten times as great were used in the horizontal coils. Since the current is direct current, the higher inductance (.6 henry, for example) of the vertical coils causes no problems. The only impedance to the flow of the derived direct current is the resistance of the vertical coils. The small current involved (4 to 5 milliamperes) causes very little loading on the peak rectifier and the horizontal circuits that drive the horizontal dynamic convergence coils. The choice of the coupling resistor 71 value can be selected to give the correct opposing direct current ampere turns.

From the foregoing description it will be readily apparent that this invention permits adjustment of the static convergence magnets independently of the so-called dynamic adjustments in the horizontal convergence circuits. The relatively high currents which are required for blue horizontal convergence in color picture reproducing tubes of large deflection angles are readily obtainable. Furthermore, accurate convergence may be maintained for relatively large variations in line voltage.

The invention claimed is:

1. In a color television receiver having a three-gun picture receiving tube, a beam convergence control circuit comprising a first set of convergence coils for controlling vertical convergence of the red, green and blue beams of said tube, voltage dividing and wave forming means coupled to said coils for providing convergence of said beams as they are deflected vertically over the surface of the picture reproducing screen of said tube, a second set of convergence coils for controlling horizontal convergence of said beams and including a first pair of coils for controlling a first one of said beam, a second pair of coils for controlling a second one of said beams, and a third pair of coils for controlling the third one of said beams, voltage dividing and wave forming means coupled to said first and second pairs of coils for providing convergence of said first and second beams as they are deflected horizontally over the surface of said screen, the respective coils for controlling vertical and horizontal convergence of each of said beams being magnetically coupled with one another, voltage dividing and wave forming means coupled to said third pair of coils for controlling convergence of said third beam, and means coupled to said vertical convergence coils coupled with said third pair of coils and to said last named voltage dividing and wave forming means for deriving a direct current voltage proportional to the alternating current flux existing in said third pair of coils and applying said direct current voltage to said vertical convergence coils coupled with said third pair of coils to create a flux opposing said alternating current flux thereby to effectively clamp the convergence current in said third pair of coils to a fixed value at the center portion of the sweep of the beam controlled by said third pair of coils.

2. The invention as claimed in claim 1 wherein said voltage dividing and wave forming means coupled to said third pair of coils comprises a resonant network.

3. The invention as claimed in claim 2 wherein said means for deriving a direct current voltage comprises a rectifier coupled between said network and said vertical convergence coils coupled with said third pair of coils.

4. The invention as claimed in claim 2 wherein said network comprises a pair of parallel connected impedances one of which is tuned to the horizontal scanning frequency and the other of which is tuned to the second harmonic thereof.

5. The invention as claimed in claim 1 wherein said voltage dividing and wave forming means coupled to said third pair of coils comprises a variable inductance for receiving a rectangular wave pulse from the horizontal scanning circuit of said receiver, a resonant network coupled between the midpoint of said inductance and said third pair of coils for providing a parabolic convergence control current in said third pair of coils, and a rectifier coupled to the midpoint of said inductance and to said vertical convergence coils coupled with said third pair of coils for causing said vertical convergence coils to create a flux proportional to and opposite to the peak of the alternating current flux created by said third pair of coils.

6. The invention as claimed in claim 5 wherein said network comprises a pair of parallel connected impedances one of which is tuned to the horizontal scanning frequency and the other of which is tuned to the second harmonic thereof.

7. In a color television receiver having a three-gun picture receiving tube, a beam convergence control circuit comprising a first set of convergence coils for controlling vertical convergence of the red, green and blue beams of said tube, voltage dividing and wave forming means coupled to said coils for providing convergence of said beams as they are deflected vertically over the surface of the picture reproducing screen of said tube, a second set of convergence coils for controlling horizontal convergence of said beams and including a first pair of coils for controlling the green beam, a second pair of coils for controlling the red beam, and a third pair of coils for controlling the blue beam, voltage dividing and wave forming means coupled to said first and second pairs of coils for providing convergence of said green and red beams as they are deflected horizontally over the surface of said screen, the respective coils for controlling vertical and horizontal convergence of each of said beams being magnetically coupled with one another, voltage dividing and wave forming means coupled to said third pair of coils for controlling convergence of said blue beam, and means coupled to said blue vertical convergence coils and to said last named voltage dividing and wave forming means for deriving a direct current voltage proportional to the alternating current flux existing in said third pair of coils and applying said direct current voltage to said blue vertical convergence coils to create a flux opposing said alternating current flux thereby to effectively clamp the blue convergence current in said third pair of coils to a fixed value at the center portion of the sweep of said blue beam.

8. In a color television image display device, the combination comprising:

first and second convergence coil means associated with an electron beam produced in the display device, said first and second convergence coil means being magnetically coupled with one another, pulse input means coupled to said first convergence coil means to produce dynamic convergence current therein;

and means coupled to said input means and to said second convergence coil means and applying to said second convergence coil means a direct current voltage derived from said pulse input means and creating a flux opposing a flux produced by said first convergence coil means, whereby a convergence current clamping effect is produced in said coil means.

9. The combination of claim 8 wherein:

said first and second convergence coil means include coils of electrically conductive material; said second coil means having a number of turns many times greater than the number of turns of said first coil means.

10. In a color television image display device, the combination comprising:

first and second convergence coil means associated with an electron beam produced in the display device, said first and second convergence coil means being magnetically coupled with one another, pulse input means;

and means coupled to said input means and to said second convergence coil means and applying to said second convergence coil means a direct current voltage creating a flux opposing a flux produced by said first convergence coil means, whereby a convergence current clamping effect is produced in said coil means, said direct current applying means including a charge storage device coupled to a rectifier and storing energy derived through said rectifier from said input means.

11. The combination of claim 10 and further comprising an image display screen, and a resistor coupled between said charge storage device and said second convergence coil means and selected to control the applied direct current to effectively clamp the beam controlling convergence current to a fixed value at a center point in the sweep of said beam across said screen.

12. The combination of claim 10 wherein:

said first and second convergence coil means include coils of electrically conductive material, the number of turns in the coils of said second coil means being many times greater than the number of turns in the coils of said first coil means whereby the loading of said pulse input means by said second convergence coil means is minimized.

13. In a color television image display device, the combination comprising:

input means for fly-back pulses from horizontal output means;

first and second convergence coil means associated with the electron beam produced by an electron gun of a picture tube, said coil means being magnetically coupled to each other;

resonant circuit means coupled to said input means and to said first coil means to produce a desired convergence current waveform in said first coil means;

peak rectifier means coupled to said input means and to said second coil means and producing in said second coil means a magnetic flux proportioned to and in a direction opposite the magnetic flux produced in said first coil means by said resonant circuit means, whereby said beam is controlled as if the effective convergence current in said coil means were clamped to a fixed value at a predetermined desired beam location in said tube.

14. The combination of claim 13 wherein:

said peak rectifier means includes a charge storage device coupled to a rectifier and storing energy derived through said rectifier from said input means.

15. In a color television image display device, the combination comprising:

convergence coil means associated with an electron beam;

sweep pulse generating means;

resonant circuit means coupled to said sweep pulse generating means and to said convergence coil means to produce convergence currents of desired waveform in said coil means;

and a rectifier and charge storage device coupled to said sweep pulse generating means and to said coil means to provide the effect of clamping convergence current in said coil means to a predetermined fixed value at a certain point in a sweep of said beam.

References Cited

UNITED STATES PATENTS

| | | | |
|---|---|---|---|
| 2,987,647 | 6/1961 | Armstrong | 315—13 |
| 3,163,797 | 12/1964 | Singleback | 315—22 |
| 3,187,218 | 6/1965 | E'del | 315—22 |

RODNEY D. BENNETT, *Primary Examiner.*

M. F. HUBLER, *Assistant Examiner.*